US 8,580,422 B2

(12) United States Patent
Whitacre et al.

(10) Patent No.: US 8,580,422 B2
(45) Date of Patent: *Nov. 12, 2013

(54) AQUEOUS ELECTROLYTE ENERGY STORAGE DEVICE

(75) Inventors: Jay Whitacre, Pittsburgh, PA (US); Don Humphreys, Pittsburgh, PA (US); Wenzhuo Yang, Pittsburgh, PA (US); Edward Lynch-Bell, Pittsburgh, PA (US); Alex Mohammad, Pittsburgh, PA (US); Eric Weber, Pittsburgh, PA (US); David Blackwood, Pittsburgh, PA (US)

(73) Assignee: Aquion Energy, Inc., Pittsburgh, PA (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/617,900

(22) Filed: Sep. 14, 2012

(65) Prior Publication Data

US 2013/0017417 A1    Jan. 17, 2013

Related U.S. Application Data

(63) Continuation of application No. 13/043,787, filed on Mar. 9, 2011, now Pat. No. 8,298,701.

(51) Int. Cl.
*H01M 10/02* (2006.01)

(52) U.S. Cl.
USPC ............................................. 429/160; 429/7

(58) Field of Classification Search
USPC .............................. 429/7, 160, 517
See application file for complete search history.

(56) References Cited

U.S. PATENT DOCUMENTS

| | | | |
|---|---|---|---|
| 3,871,924 | A | 3/1975 | DeMattie et al. |
| 4,100,332 | A | 7/1978 | Carr |
| 4,246,253 | A | 1/1981 | Hunter |
| 5,316,877 | A | 5/1994 | Thackeray et al. |
| 5,476,734 | A | 12/1995 | Pulley et al. |

(Continued)

FOREIGN PATENT DOCUMENTS

| | | |
|---|---|---|
| CN | 101154745 A | 4/2008 |
| JP | 2000-331682 A | 11/2000 |

(Continued)

OTHER PUBLICATIONS

Akimoto et al., "Synthesis and Electrochemical Properties of $Li_{0.44}MnO_2$ as a Novel 4 V Cathode Material," Electrochemical and Solid-State Letters, 2005, 8(10):A554-A557.

(Continued)

*Primary Examiner* — Mark F Huff
*Assistant Examiner* — Monique Wills
(74) *Attorney, Agent, or Firm* — The Marbury Law Group PLLC

(57) ABSTRACT

An electrochemical device including a housing and a stack of electrochemical cells in the housing. Each electrochemical cell includes an anode electrode, a cathode electrode, a separator located between the anode electrode and the cathode electrode and an electrolyte. The electrochemical device also includes a current collector located between adjacent electrochemical cells, an anode bus operatively connected to the anodes of the electrochemical cells in the stack and a cathode bus operatively connected to the cathodes of the electrochemical cells in the stack. The housing, the anode electrode, the cathode electrode, the separator, the anode bus and the cathode bus are non-metallic.

18 Claims, 8 Drawing Sheets

(56) References Cited

U.S. PATENT DOCUMENTS

| | | | |
|---|---|---|---|
| 5,525,442 | A | 6/1996 | Shuster |
| 5,558,961 | A | 9/1996 | Doeff et al. |
| 5,958,624 | A | 9/1999 | Frech et al. |
| 5,963,417 | A | 10/1999 | Anderson et al. |
| 6,017,654 | A | 1/2000 | Kumta et al. |
| 6,040,089 | A | 3/2000 | Manev et al. |
| 6,159,637 | A | 12/2000 | Shizuka et al. |
| 6,248,477 | B1 | 6/2001 | Howard, Jr. et al. |
| 6,267,943 | B1 | 7/2001 | Manev et al. |
| 6,322,744 | B1 | 11/2001 | Kelley et al. |
| 6,325,988 | B1 | 12/2001 | Inoue et al. |
| 6,383,683 | B1 | 5/2002 | Nagayama et al. |
| 6,413,673 | B1 | 7/2002 | Kasai et al. |
| 6,423,294 | B2 | 7/2002 | Manev et al. |
| 6,465,129 | B1 | 10/2002 | Xu et al. |
| 6,465,130 | B1 | 10/2002 | Numata et al. |
| 6,531,220 | B1 | 3/2003 | Kweon et al. |
| 6,599,662 | B1 | 7/2003 | Chiang et al. |
| 6,670,076 | B1 | 12/2003 | Iwata et al. |
| 6,673,491 | B2 | 1/2004 | Shirakawa et al. |
| 6,692,665 | B2 | 2/2004 | Shima et al. |
| 6,787,232 | B1 | 9/2004 | Chiang et al. |
| 6,814,894 | B2 | 11/2004 | Shoji et al. |
| 6,869,547 | B2 | 3/2005 | Barker et al. |
| 6,872,492 | B2 | 3/2005 | Barker et al. |
| 7,008,726 | B2 | 3/2006 | Adamson et al. |
| 7,041,239 | B2 | 5/2006 | Barker et al. |
| 7,056,486 | B2 | 6/2006 | Park et al. |
| 7,087,346 | B2 | 8/2006 | Barker et al. |
| 7,199,997 | B1 | 4/2007 | Lipka et al. |
| 7,214,448 | B2 | 5/2007 | Barker et al. |
| 7,335,444 | B2 | 2/2008 | Numata et al. |
| 8,298,701 | B2 * | 10/2012 | Whitacre et al. .............. 429/160 |
| 2002/0009645 | A1 | 1/2002 | Shima et al. |
| 2002/0048706 | A1 | 4/2002 | Mayes et al. |
| 2002/0182502 | A1 | 12/2002 | Park et al. |
| 2003/0003369 | A1 | 1/2003 | Dai |
| 2003/0035999 | A1 | 2/2003 | Gao et al. |
| 2003/0186128 | A1 | 10/2003 | Singh et al. |
| 2003/0190528 | A1 | 10/2003 | Saidi et al. |
| 2004/0185339 | A1 | 9/2004 | Jones |
| 2004/0191627 | A1 | 9/2004 | Takahashi et al. |
| 2004/0262571 | A1 | 12/2004 | Barker et al. |
| 2005/0181280 | A1 | 8/2005 | Ceder et al. |
| 2005/0181283 | A1 | 8/2005 | Pugh et al. |
| 2005/0238953 | A1* | 10/2005 | Urso et al. .................... 429/163 |
| 2005/0238961 | A1 | 10/2005 | Barker et al. |
| 2006/0019166 | A1 | 1/2006 | Numata et al. |
| 2006/0035151 | A1 | 2/2006 | Kumeuchi et al. |
| 2006/0154071 | A1 | 7/2006 | Homma et al. |
| 2006/0176675 | A1 | 8/2006 | Bourns et al. |
| 2006/0263688 | A1 | 11/2006 | Guyomard et al. |
| 2007/0072034 | A1 | 3/2007 | Barker et al. |
| 2007/0160901 | A1 | 7/2007 | Kaun |
| 2008/0008937 | A1 | 1/2008 | Eylem et al. |
| 2008/0158778 | A1 | 7/2008 | Lipka et al. |
| 2009/0053613 | A1 | 2/2009 | Inoue et al. |
| 2009/0253205 | A1 | 10/2009 | Whitacre |
| 2010/0239913 | A1 | 9/2010 | Kelley et al. |
| 2011/0052945 | A1 | 3/2011 | Whitacre |
| 2011/0274950 | A1 | 11/2011 | Whitacre |

FOREIGN PATENT DOCUMENTS

| | | |
|---|---|---|
| JP | 2003-086179 A | 3/2003 |
| KR | 10-2001-0024357 A | 3/2001 |
| KR | 10-2007-0100918 A | 10/2007 |
| WO | WO 02/052067 | 7/2002 |
| WO | WO 2006/111079 A1 | 10/2006 |
| WO | WO 2008/051885 | 5/2008 |
| WO | WO 2009/126525 | 10/2009 |

OTHER PUBLICATIONS

Alcantara et al., "Carbon Microspheres Obtained from Resorcinol-Formaldehyde as High-Capacity Electrodes for Sodium-Ion Batteries," Electrochemical and Solid-State Letters, 2005, 8(4):A222-A225.

Alcantara et al., "$NiCo_2O_4$ Spinel: First Report on a Transition Metal Oxide for the Negative Electrode of Sodium-Ion Batteries," Chem. Mater., 2002, 14:2847-2848.

Athouel et al., "Birnessite as Possible Candidate for Hybrid Carbon/$MnO_2$ Electrochemical Capacitor," Abstract from 214th ECS Meeting, Honolulu, HI, Oct. 12-17, 2008.

Bordet-Le Geunne et al., "Structural study of two layered phases in the $Na_xMn_yO_2$ system. Electrochemical behavior of their lithium substituted derivatives," J. Mater. Chem., 2000, 10:2201-2206.

Brousse et al., "A Hybrid Activated Carbon-Manganese Dioxide Capacitor using a Mild Aqueous Electrolyte," Journal of the Electrochemical Society, 2004, 151(4):A614-A622.

Brousse et al., "Crystalline $MnO_2$ as Possible Alternatives to Amorphous Compounds in Electrochemical Supercapacitors," Journal of Electrochemical Society, 2006: 153, A2171-A2080.

Cvjeticanin et al., "Cyclic voltammetry of $LiCr_{0.15}Mn_{1.85}O_4$ in an aqueous $LiNO_3$ solution," Journal of Power Sources, 2007, 174:1117-1120.

Doeff et al., "A High-Rate Manganese Oxide for Rechargeable Lithium Battery Applications," Journal of the Electrochemical Society, 2001, 148(3):A230-A236.

Doeff et al., "Electrochemical and structural characterization of titanium-substituted manganese oxides based on $Na_{0.44}MnO_2$," Journal of Power Sources, 2004, 125:240-248.

Doeff et al., "Lithium Insertion Processes of Orthorhombic $Na_xMnO_2$-Based Electrode Materials," J. Electrochem. Soc., Aug. 1996, 143(8):2507-2516.

Doeff et al., "Synthesis and characterization of a copper-substituted manganese oxide with the $Na_{0.44}MnO_2$ structure," Journal of Power Sources, 20002, 112:294-297.

Doeff et al., "Orthorhomic $Na_xMnO_2$ as a Cathode Material for Secondary Sodium and Lithium Polymer Batteries," J. Electrochem Soc. vol. 141, No. 11, Nov. 1994.

Eftekhari et al., "Effect of Na diffusion on the formation of fibrous microcrystals of manganese oxide," Materials Research Bulletin, 2005, 40:2205-2211.

Feng et al., "Hydrothermal Soft Chemical Synthesis of Tunnel Manganese Oxides with $Na^+$ as Template," Chemistry Letters, 2000:284-285.

Huang et al., "Kinetics of Electrode Processes of $LiFePO_4$ in Saturated Lithium Nitrate Solution," Acta Phys.-Chim. Sin., 2007, 23(1):129-133.

Imanishi et al., "Study of Electrochemical Sodium Deintercalation of a $Na_xFeO_2$," Denki Kagaku, 1993, 61 (12): 1451-1452.

PCT/US2009/039436, International Search Report & Written Opinion, Nov. 13, 2009, 8pgs; & International Preliminary Report on Patentability, Oct. 21, 2010, 5pgs.

Jin et al., "Hybrid supercapacitor based on $MnO_2$ and columned FeOOH using $Li_2SO_4$ electrolyte solution," Journal of Power Sources, 2008, 175:686-691.

Kanoh et al., "Electrochemical Intercalation of Alkali-Metal Ions into Birnessite-Type Manganese Oxide in Aqueous Solution," Langmuir, 1997, 13:6845-6849.

Kanoh et al., "Equilibrium Potentials of Spinel-Type Manganese Oxide in Aqueous Solutions," J. Electrochem. Soc., Nov. 1993, 140(11):3162-3166.

Kim et al., "Electrochemical properties of sodium/pyrite battery at room temperature," Journal of Power Sources, 2007, 174:1275-1278.

Kim et al., "Ionic conductivity of sodium ion with $NaCF_3SO_3$ salts in electrolyte for sodium batteries," Materials Science Forum, 2005, 486-487:638-641.

Komaba et al., "Enhanced Supercapacitive Behaviors of Birnessite Type Manganese Dioxide," Abstract from 214th ECS Meeting, Honolulu, HI, Oct. 12-17, 2008.

(56) References Cited

OTHER PUBLICATIONS

Li et al., "A study of nitroxide polyradical/activated carbon composite as the positive electrode material for electrochemical hybrid capacitor," Electrochimica Acta, 2007, 52:2153-2157.

Li et al., "Rechargeable Lithium Batteries with Aqueous Electrolytes," Science, May 20, 1994, 264:1115-1118.

Ma et al., "A novel concept of hybrid capacitor based on manganese oxide materials," Electrochemistry Communications, 2007, 9:2807-2811.

Mi et al., "Electrochemical behaviors of solid $LiFePO_4$ and $Li_{0.99}Nb_{0.01}FePO_4$ in $Li_2SO_4$ aqueous electrolyte," Journal of Electroanalytical Chemistry, 2007, 602:245-254.

Park et al., "A Study of Copper as a Cathode Material for an Ambient Temperature Sodium Ion Batter," Journal of the Electrochemical Society, 2001, 148(12):A1346-A1351.

Park et al., "Room-Temperature Solid-State Sodium/Sulfur Battery," Electrochemical and Solid-Satte Letters, 2006, 9(3):A123-A125.

Pitcher, Graham, "If the cap fits . . . How supercapacitors can help to solve power problems in portable products," New Electronics, Portable Products Special Report, www.neon.co.uk, Mar. 28, 2006, 25-26.

Renuka, "An Investigation on Layered Birnessite Type Manganese Oxides for Battery Applications," Journal of Power Sources, 2000, 78: 144-152.

Rydh et al., "Energy analysis of batteries in photovoltaic systems. Part I: Performance and energy requirements," Energy Conversion and Management, 2005, 46:1957-1979.

Rydh et al., "Energy analysis of batteries in photovoltaic systems. Part II: Performance and energy requirements," Energy Conversion and Management, 2005, 46:1980-2000.

Sauvage et al., "Study of the Insertion/Deinsertion Mechanism of Sodium into $Na_{0.44}MnO_2$," Inorganic Chemistry, 2007, 46:3289-3294.

Sauvage et al., "Study of the potentiometric response towards sodium ions of $Na_{0.44-x}MnO_2$ for the development of selective sodium ion sensors," Sensors and Actuators B, 2007, 120:638-644.

Spahr et al., "Electrochemical insertion of lithium, sodium, and magnesium in molybdenum(VI) oxide," Journal of Power Sources, 1995, 54:346-351.

Su et al., "Symmetric Self-Hybrid Supercapacitor Consisting of Multiwall Carbon Nanotubes and Co-Al Layered Double Hydroxides," Journal of the Electrochemical Society, 2008, 155(2):A110-A114.

Tani et al,. "Alkali Metal Ion-Selective Electrodes Based on Relevant Alkali Metal Ion Doped Manganese Oxides," Mikrochim. Acta 1998, 129:81-90.

Tevar et al., Cycling-Induced Crystallographic & Morphological Changes in Na4Mn9O18. 214th ECS Meeting, Abstract #642, The Electrochemical Society, Oct. 2008.

Toupin et al., "Charge Storage Mechanism of $MnO_2$ Electrode Used in Aqueous Electrochemical Capacitor," Chemistry of Materials, 2004, 16: 3184-3190.

Wang et al., "Improvement of cycle performance of lithium ion cell $LiMn_2O_4/Li_xV_2O_5$ with aqueous solution electrolyte by polypyrrole coating an anode," Electrochimica Acta, 2007, 52:5102-5107.

Wang et al., "A New Concept Hybrid Electrochemical Supercapacitor: Carbon/$LiMn_2O_4$ Aqueous System," Electrochemistry Communications, 2005, 7:1138-1142.

Whitacre et al., "Na4Mn9O18 as a Positive Electrode Material for an Aqueous Electrolyte Sodium-Ion Energy Storage Device," Electrochemistry Communications, 2010, 12:463-466.

Yang et al., "Interfacial synthesis of porous $MnO_2$ and its application in electrochemical capacitor," Electrochimica Acta, 2007, 53:752-757.

Zhuo et al., "The preparation of $NaV_{1-x}Cr_xPO_4F$ cathode materials or sodium-ion battery," Journal of Power Sources, 2006, 160:698-703.

International Search Report & Written Opinion issued in PCT Application No. PCT/US2012/028228, mailed on Oct. 29, 2012.

* cited by examiner

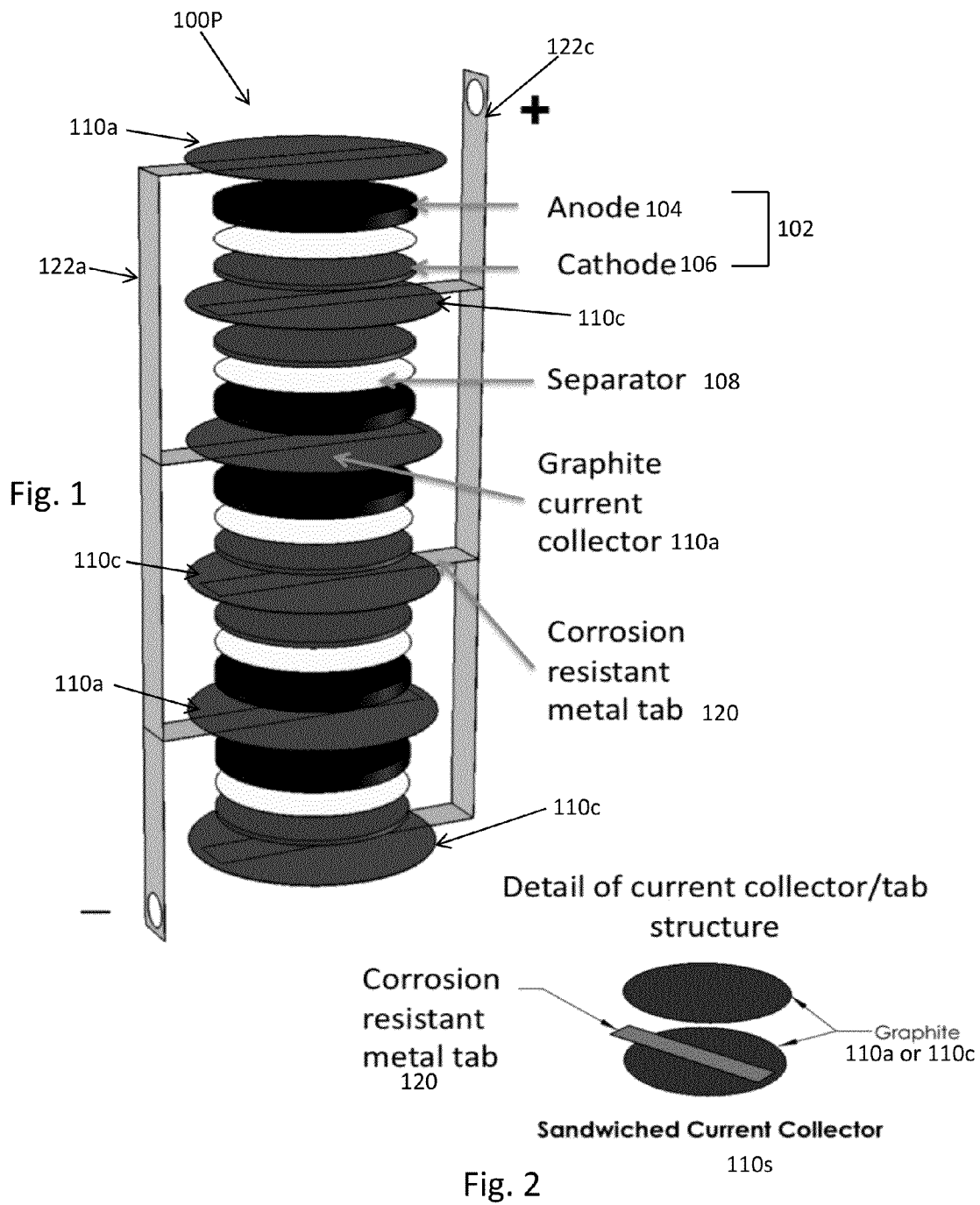

Fig. 9
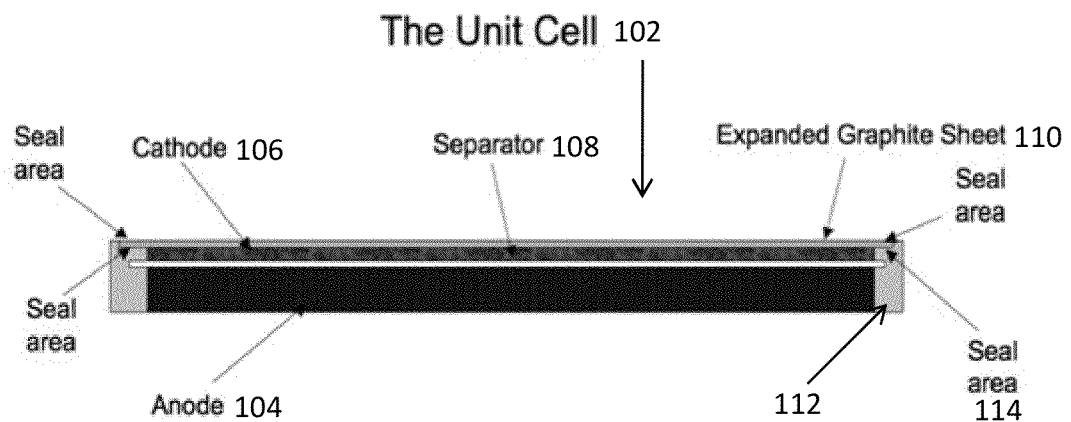
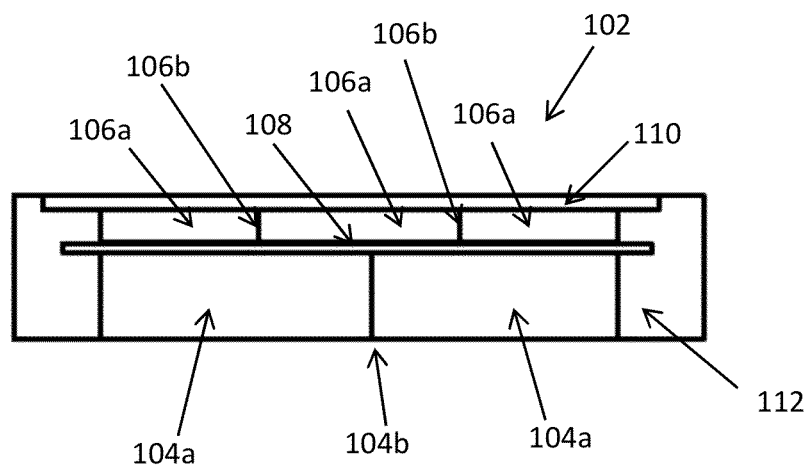
Fig. 10

Fig. 12(a)
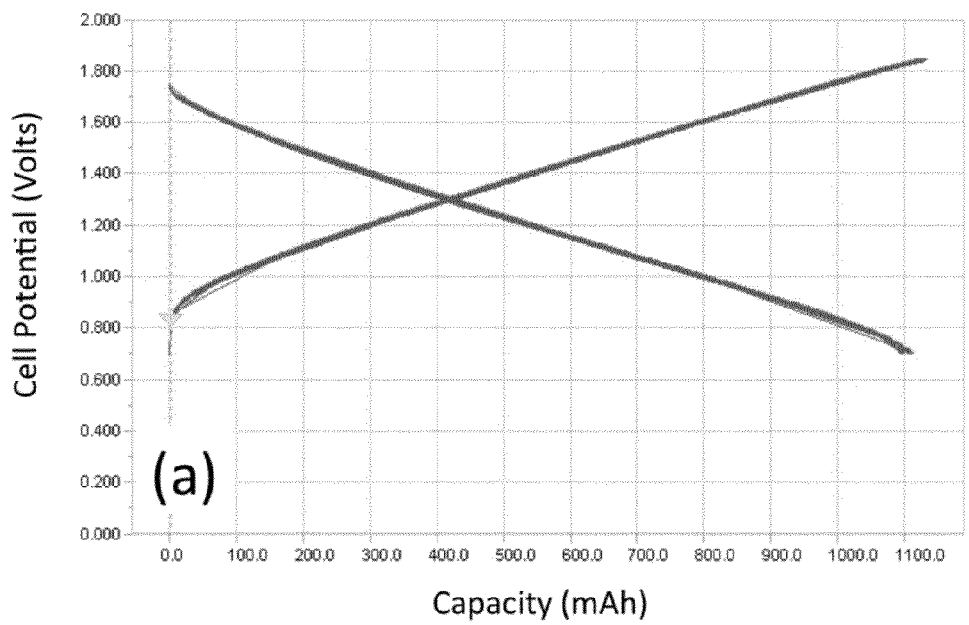
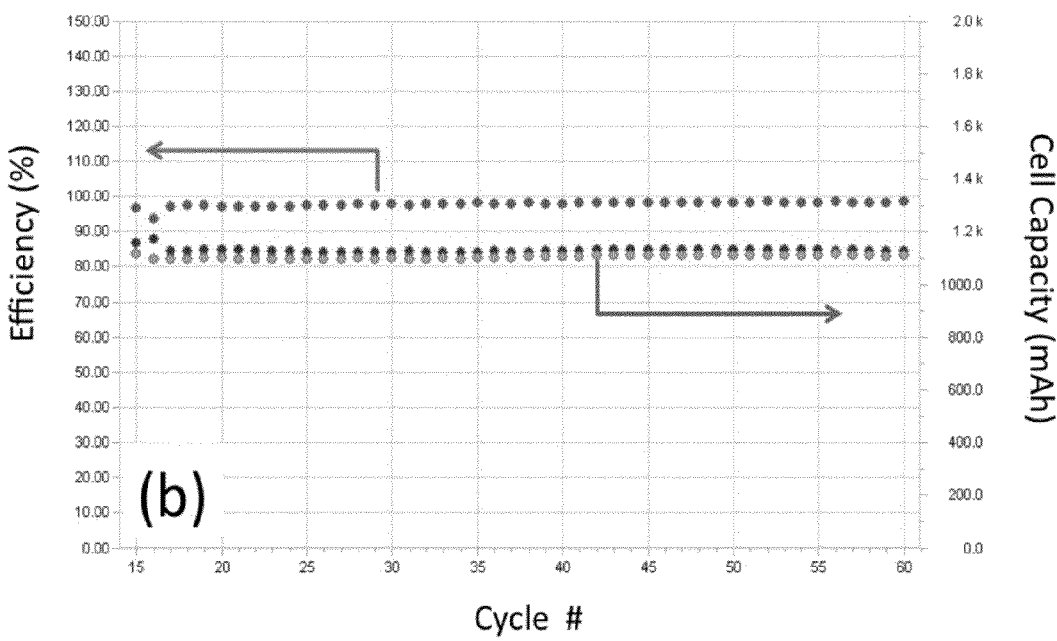
Fig. 12(b)

AQUEOUS ELECTROLYTE ENERGY STORAGE DEVICE

FIELD

The present invention is directed to aqueous batteries and hybrid energy storage devices, and in particular to electrochemical storage devices without metal parts in contact with the aqueous electrolyte.

BACKGROUND

Small renewable energy harvesting and power generation technologies (such as solar arrays, wind turbines, micro sterling engines, and solid oxide fuel cells) are proliferating, and there is a commensurate strong need for intermediate size secondary (rechargeable) energy storage capability. Batteries for these stationary applications typically store between 1 and 50 kWh of energy (depending on the application) and have historically been based on the lead-acid (Pb acid) chemistry. Banks of deep-cycle lead-acid cells are assembled at points of distributed power generation and are known to last 1 to 10 years depending on the typical duty cycle. While these cells function well enough to support this application, there are a number of problems associated with their use, including: heavy use of environmentally unclean lead and acids (it is estimated that the Pb-acid technology is responsible for the release of over 100,000 tons of Pb into the environment each year in the US alone), significant degradation of performance if held at intermediate state of charge or routinely cycled to deep levels of discharge, a need for routine servicing to maintain performance, and the implementation of a requisite recycling program. There is a strong desire to replace the Pb-acid chemistry as used by the automotive industry. Unfortunately the economics of alternative battery chemistries has made this a very unappealing option to date.

Despite all of the recent advances in battery technologies, there are still no low-cost, clean alternates to the Pb-acid chemistry. This is due in large part to the fact that Pb-acid batteries are remarkably inexpensive compared to other chemistries ($200/kWh), and there is currently a focus on developing higher-energy systems for transportation applications (which are inherently significantly more expensive than Pb-acid batteries).

SUMMARY

An embodiment relates to an electrochemical device including a housing and a stack of electrochemical cells in the housing. Each electrochemical cell includes an anode electrode, a cathode electrode, a separator located between the anode electrode and the cathode electrode and an electrolyte. The electrochemical device also includes a current collector located between adjacent electrochemical cells, an anode bus operatively connected to the anodes of the electrochemical cells in the stack and a cathode bus operatively connected to the cathodes of the electrochemical cells in the stack. The housing, the anode electrode, the cathode electrode, the separator, the anode bus and the cathode bus are non-metallic.

Another embodiment relates to a method of making an electrochemical device. The method includes stacking a first non-metallic anode electrode, stacking a first non-metallic separator on the anode electrode and stacking a first non-metallic cathode electrode on the separator. The method also includes operatively connecting the first anode electrode to a non-metallic anode bus and operatively connecting the first cathode electrode to a non-metallic cathode bus.

An embodiment relates to an electrochemical device that includes a housing and a stack of electrochemical cells in the housing. Each electrochemical cell includes an anode electrode, a cathode electrode, a separator located between the anode electrode and the cathode electrode and an electrolyte. The device also includes a plurality of carbon cathode and anode current collectors alternately located between adjacent electrochemical cells and a plurality of tabs operatively connected to the plurality of carbon cathode and anode current collectors, the plurality of tabs configured to connect to an electrical bus. A cathode electrode of a first electrochemical cell electrically contacts a first cathode current collector. A cathode electrode of a second electrochemical cell electrically contacts the first cathode current collector. The second electrochemical cell is located adjacent to a first side of the first electrochemical cell in the stack. An anode electrode of the first electrochemical cell electrically contacts a second anode current collector. An anode electrode of a third electrochemical cell electrically contacts the second anode current collector. The third electrochemical cell is located adjacent to a second side of the first electrochemical cell in the stack.

Another embodiment relates to an electrochemical device including a housing and a stack of electrochemical cells in the housing. Each electrochemical cell includes a pressed granular anode electrode, a pressed granular cathode electrode, a separator located between the anode electrode and the cathode electrode and an electrolyte. The electrochemical device also includes a plurality of cathode and anode current collectors alternately located between adjacent electrochemical cells. A cathode electrode of a first electrochemical cell electrically contacts a first cathode current collector. A cathode electrode of a second electrochemical cell electrically contacts the first cathode current collector. The second electrochemical cell is located adjacent to a first side of the first electrochemical cell in the stack. An anode electrode of the first electrochemical cell electrically contacts a second anode current collector and an anode electrode of a third electrochemical cell electrically contacts the second anode current collector. The third electrochemical cell is located adjacent to a second side of the first electrochemical cell in the stack.

Another embodiment relates to an electrochemical device that includes a housing and a plurality of stacks of electrochemical cells arranged side by side in the housing. Each electrochemical cell includes an anode electrode, a cathode electrode, a separator located between the anode electrode and the cathode electrode and an electrolyte. The device also includes a current collector located between adjacent electrochemical cells in each of the stacks. The separator of at least one cell comprises a separator sheet which extends continuously between at least two of the plurality of stacks.

An embodiment relates to an electrochemical device including a housing and a stack of electrochemical cells in the housing. Each electrochemical cell includes an anode electrode, a cathode electrode, a separator located between the anode electrode and the cathode electrode and an electrolyte. The electrochemical device also includes a graphite sheet located between adjacent electrochemical cells in the stack. The graphite sheet is a current collector for adjacent electrochemical cells.

Another embodiment relates to an electrochemical cell including an anode electrode with a plurality of discrete anode electrode members separated by anode boundary areas and a cathode electrode with a plurality of discrete cathode electrode members separated by cathode boundary areas. The electrochemical cell also includes a separator located between the anode electrode and the cathode electrode and an electrolyte. The electrolyte is located in the separator and in the anode electrode and cathode electrode boundary areas. Further, at least 50% of the anode boundary areas are not aligned with a respective cathode boundary areas across the separator.

Another embodiment relates to a method of making an electrochemical device having a stack of electrochemical cells. The method includes forming a stack electrochemical cells and pouring an electrically insulating polymer around the stack of electrochemical cells and solidifying the polymer to form a solid insulating shell or providing a preformed solid insulating shell around the stack of electrochemical cells.

Another embodiment relates to a method of making an electrochemical device. The method includes stacking an anode electrode comprising a plurality of discrete anode electrode members separated by anode boundary areas, stacking a separator on the anode electrode and stacking a cathode electrode comprising a plurality of discrete cathode electrode members separated by cathode boundary areas on the separator. At least 50% of the anode boundary areas are not aligned with a respective cathode boundary areas across the separator and the plurality of anode electrode members and the plurality of cathode electrode members are arranged in an array of rows and columns.

Another embodiment relates to a secondary hybrid aqueous energy storage device. The secondary hybrid aqueous energy storage device includes a housing and a stack of electrochemical cells in the housing. Each electrochemical cell includes an anode electrode, a cathode electrode and a separator located between the anode electrode and the cathode electrode, an electrolyte and a graphite sheet located between adjacent electrochemical cells. The anode and cathode electrodes are between 0.05 and 1 cm thick.

BRIEF DESCRIPTION OF THE DRAWINGS

FIG. 1 is a schematic illustration of a prismatic stack of electrochemical cells according to an embodiment.

FIG. 2 is a schematic illustration of a detail of a sandwiched current collector according to an embodiment.

FIG. 9 is a schematic illustration of an electrochemical cell according to an embodiment of the invention. The electrochemical cell may be stacked in a bipolar or prismatic stack configuration.

FIG. 10 is a cross sectional view of an electrochemical cell with an anode electrode composed of discrete anode electrode members and a cathode electrode composed of discrete cathode electrode members according to an embodiment. The electrochemical cell may be stacked in a bipolar or prismatic stack configuration.

FIG. 12($a$) is a plot of cell potential vs. accumulated capacity under charge and discharge conditions over 30 cycles. FIG. 12($b$) is a plot of cell charge and discharge capacity and efficiency as a function of cycle.

DETAILED DESCRIPTION

Figure 3:
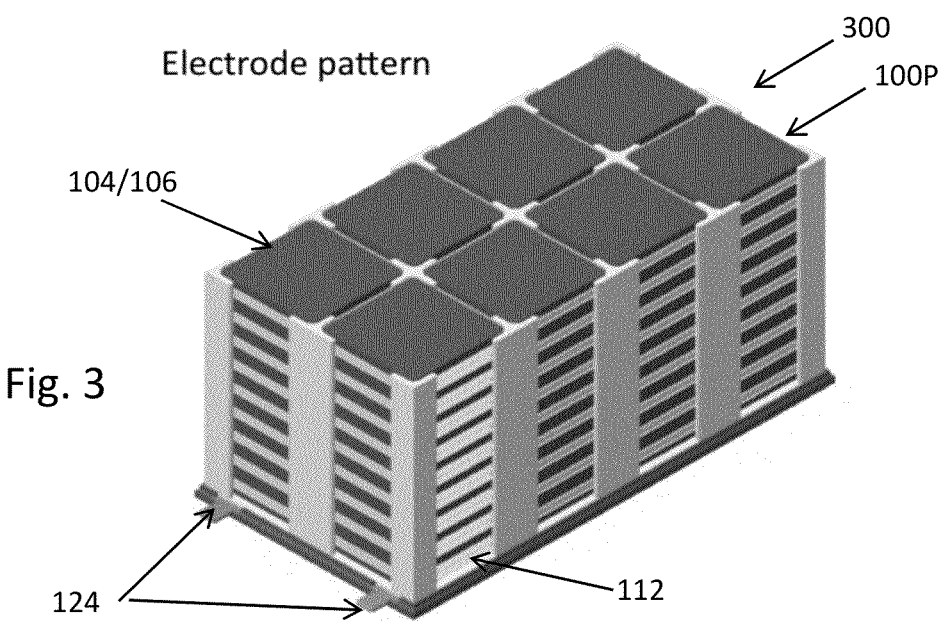
FIG. 3 is a perspective view of an electrochemical device having a plurality of prismatic stacks of electrochemical cells according to an embodiment.

Embodiments of the invention are drawn to electrochemical energy storage systems, such as primary and secondary batteries and hybrid energy storage systems described below. While secondary hybrid aqueous energy storage systems described below are preferred embodiments of the invention, the invention is also applicable to any suitable electrochemical energy storage systems, such as aqueous and non-aqueous electrolyte containing batteries (e.g., having anodes and cathodes which intercalate ions from the electrolyte, including Li-ion batteries, etc.) or electrolytic capacitors (also known as supercapacitors and ultracapacitors, e.g., having capacitor or pseudocapacitor anode and cathode electrodes that store charge through a reversible nonfaradiac reaction of cations on the surface of the electrode (double-layer) and/or pseudocapacitance rather than by intercalating alkali ions).

Hybrid electrochemical energy storage systems of embodiments of the present invention include a double-layer capacitor or pseudocapacitor electrode (e.g., anode) coupled with an active electrode (e.g., cathode). In these systems, the capacitor or pseudocapacitor electrode stores charge through a reversible nonfaradiac reaction of alkali cations on the surface of the electrode (double-layer) and/or pseudocapacitance, while the active electrode undergoes a reversible faradic reaction in a transition metal oxide that intercalates and deintercalates alkali cations similar to that of a battery.

An example of a Na-based system has been described in U.S. patent application Ser. No. 12/385,277, filed on Apr. 3, 2009 and incorporated herein by reference in its entirety, which utilizes a spinel structure $LiMn_2O_4$ battery electrode, an activated carbon capacitor electrode, and an aqueous $Na_2SO_4$ electrolyte. In this system, the negative anode electrode stores charge through a reversible nonfaradiac reaction of Na-ion on the surface of an activated carbon electrode. The positive cathode electrode utilizes a reversible faradiac reaction of Na-ion intercalation/deintercalation in spinel lambda-$MnO_2$.

In an alternative system, the cathode electrode may comprise a non-intercalating (e.g., non-alkali ion intercalating) $MnO_2$ phase. Example non-intercalating phases of manganese dioxide include electrolytic manganese dioxide (EMD), alpha phase and gamma phase.

FIG. 1 illustrates a prismatic stack 100P of electrochemical cells 102 according to an embodiment. In this embodiment, each of the electrochemical cells 102 in the prismatic stack 100P includes an anode electrode 104, a cathode electrode 106, and a separator 108 located between the anode electrode 104 and the cathode electrode 106. The electrochemical cells 102 also include an electrolyte located between the anode electrode 104 and the cathode electrode 106 (i.e., impregnated in the separator and/or the electrodes). Each of the electrochemical cells 102 of the prismatic stack 100P may be mounted in a frame 112 (see FIGS. 9-10). Further, the prismatic stack 100P may be enclosed in a housing 116 (see FIGS. 3-6) instead of or in addition to. Additional features of the housing 116 are provided in more detail below in relation to the embodiments illustrated in FIGS. 3-6. Further embodiments of the electrochemical cells 102 are illustrated in FIGS. 9 and 10 and discussed in more detail below. The prismatic stack 100P also includes a plurality of carbon cathode and anode current collectors 110$a$, 110$c$ alternately located between adjacent electrochemical cells 102. The current collectors may comprise any suitable form of electrically conductive carbon, such as, exfoliated graphite, carbon fiber paper, or an inert substrate coated with carbon material. Preferably, the collectors comprise graphite having a density greater than 0.6 g/cm$^3$.

In an embodiment, the prismatic stack 100P includes a plurality of electrically conductive contacts (e.g., tabs) 120 operatively connected to the plurality of carbon cathode and anode current collectors 110a, 110c. The electrically conductive contacts 120 may be affixed to one side of the carbon cathode and anode current collectors 110a, 110c. Alternatively, as illustrated in FIG. 2, the electrically conductive contacts 120 may be located in between two carbon current collectors 110a or 110c, making a sandwich structure 110s. Preferably, the prismatic stack 100P also includes two electrical buses 122a, 122c. One electrical bus 122a electrically connected to the anode current collectors 110a in the prismatic stack 100P and one electrical bus connected 122c to the cathode current collectors 110c in the prismatic stack 100P. In an embodiment, the electrical connection from the anode and cathode current collectors 110a, 110c to the electrical buses 122a, 122c is via the electrically conductive contacts 120. In this manner, the electrochemical cells 102 in the stack 100P can be electrically connected in parallel.

In an embodiment, the positive cathode bus 122c electrically connects the cathode electrodes 106 of the electrochemical cells 102 in the stack 100P in parallel to a positive electrical output of the stack, while the negative anode bus 122a electrically connects the anode electrodes 104 of the electrochemical cells 102 in the stack 100P in parallel to a negative electrical output of the stack 100P.

In the prismatic stack 100P, the cathode current collector 110c may be located in between adjacent electrochemical cells 102. That is, pairs of electrochemical cells 102 are configured "front-to-front" and "back-to-back." As an example, consider a prismatic stack 100P in which the first electrochemical cell 102 is in the center of the stack 100P. In a first pair of cells 102 the first cathode current collector 110c is located such that a cathode electrode 106 of the first electrochemical cell 102 electrically contacts the first cathode current collector 110c and a cathode electrode 106 of a second electrochemical cell 102 also electrically contacts the first cathode current collector 110c. The second electrochemical cell 102 is located adjacent to a first (cathode) side of the first electrochemical cell in the prismatic stack 100P.

A third electrochemical cell 102 is located adjacent to the second (anode) side of the first electrochemical cell 102 in the prismatic stack 100P. The anode electrode 104 of the first electrochemical cell 102 electrically contacts a first anode current collector 110a and the anode electrode 104 of the third electrochemical cell 102 also electrically contacts the first anode current collector 110a. Stacking can continue in this manner. The resulting prismatic stack 100P therefore may include a plurality of electrochemical cells 102 that are stacked in pairs, front-to-front and back-to-back, alternating adjacent anode electrodes 104 and adjacent cathode electrodes 106.

The prismatic stack 100P may be described in terms of an axial direction. For the stack 100P illustrated in FIG. 1, the axial direction is parallel to the buses 122a, 122c. The electrochemical cells 102 in the stack 100P are stacked in an axial direction along an axis of the stack 100P. Each of the odd or even numbered electrochemical cells 120 in the stack have a cathode electrode 106 facing a first end of the axis of the stack 100P and an anode electrode 104 facing the opposite, second end of the axis of the stack 100P. Each of the other ones of the even or odd numbered electrochemical cells 102 in the stack 100P have a cathode electrode 106 facing the second end of the axis of the stack 100P and an anode electrode 104 facing the opposite, first end of the axis of the stack 100P.

In an embodiment, the prismatic stack 100P includes electrochemical cells 102 in which the anode electrode 104 and/or the cathode electrode 106 are made of pressed granular pellets. The anode electrode 104 and cathode electrode 106 may be between 0.05 and 1 cm thick. Alternatively, the anode electrode 104 and cathode electrode 106 are between 0.05 and 0.15 cm thick. Boundary areas between the pressed granular pellets may provide reservoirs for electrolyte, as will be described in more detail below.

In an embodiment, the electrochemical cells 102 are secondary hybrid aqueous energy storage devices. In an embodiment, the cathode electrode 106 in operation reversibly intercalates alkali metal cations. The anode electrode 104 may comprise a capacitive electrode which stores charge through a reversible nonfaradiac reaction of alkali metal cations on a surface of the anode electrode 104 or a pseudocapacitive electrode which undergoes a partial charge transfer surface interaction with alkali metal cations on a surface of the anode electrode 104. In an embodiment, the anode is a pseudocapacitive or electrochemical double layer capacitive material that is electrochemically stable to less than −1.3 V vs. a normal hydrogen electrode (NHE). In an embodiment, the cathode electrode 106 may comprise a doped or undoped cubic spinel λ-$MnO_2$-type material or $NaMn_9O_{18}$ tunnel structured orthorhombic material and the anode electrode 104 may comprise activated carbon. Alternatively, the cathode electrode may comprise a non-intercalating $MnO_2$ phase, such as electrolytic manganese dioxide (EMD), alpha or gamma phase.

Figure 4:
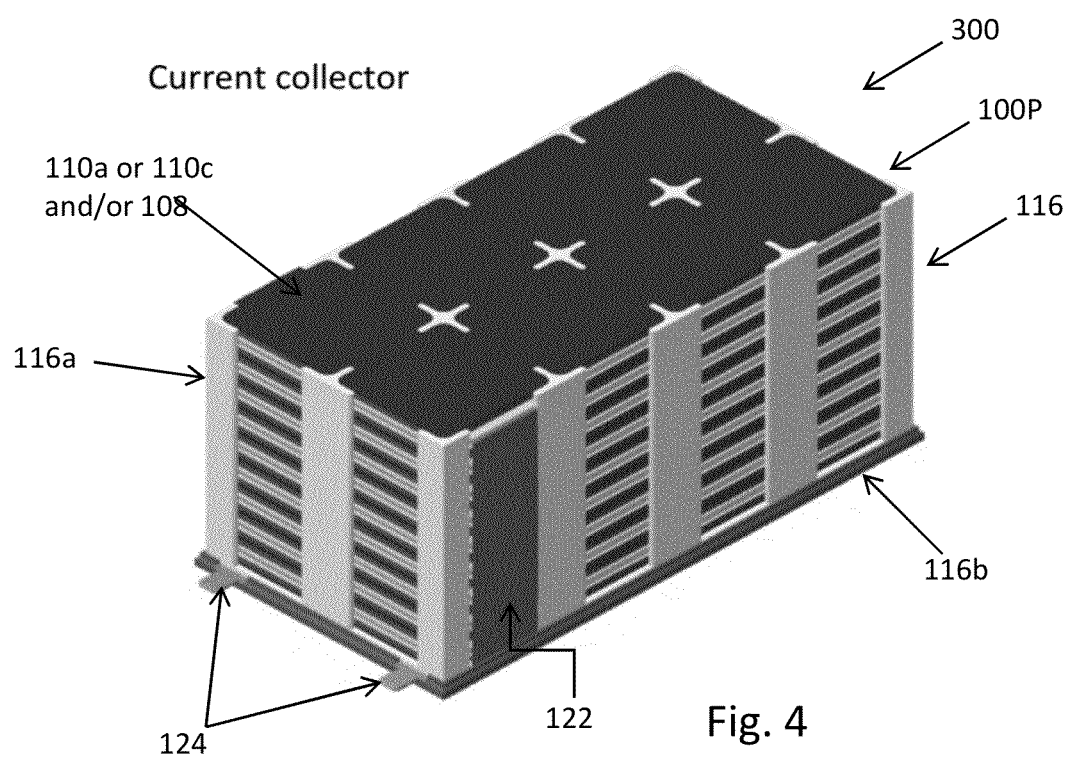
FIG. 4 is another perspective view of the embodiment illustrated in FIG. 3.

Another embodiment of the invention is illustrated in FIGS. 3 and 4. In this embodiment, the electrochemical device 300 includes eight stacks 100P of electrochemical cells 102 in a two by four array. However, any number of stacks 100P may be included. For example, the electrochemical device 300 may include two stacks 100P in a one by two array, three stacks 100P in a one by three array, twelve stacks 100P in a three by four array, or 25 stacks 100P in a five by five array. The exact number of stacks 100P may be selected according to the desire or power needs of the end user.

The electrochemical device 300 preferably includes a housing 116. In this embodiment, the housing 116 includes a base 116b and a plurality of sidewall members 116a. In an embodiment, the anode electrodes 104 and the cathode electrodes 106 of the electrochemical cells 102 in each of the plurality of stacks 100P are exposed along their edges but are constrained by the housing 116. Preferably, the housing 116 provides pressure through each stack 100P, thereby keeping the stacks 100P of the electrochemical device 300 secure. In an alternative embodiment, the anode electrodes 104 and the cathode electrodes 106 of the electrochemical cells 102 in each of the plurality of stacks 100P are partially or completely covered and constrained along their edges. This may be accomplished, for example, by mounting the anode electrodes 104 and the cathode electrodes 106 of each cell 102 in a frame 112, as shown in FIG. 9. Other housing configurations may also be used. For example, the housing 116 may include a base 116b and a single, unitary sidewall member 116a, similar to a bell jar.

In this embodiment, the separator 108 and/or the anode current collector 110a and/or the cathode current collector 110c of at least one electrochemical cell 102 extends continuously between at least two of the plurality of stacks 100P. Preferably, the separator 108, the anode current collector 110a and the cathode current collector 110c extend continuously between all of the stacks 100P in the electrochemical device 300. In this manner, the electrochemical device 300 can be easily and inexpensively fabricated. The cathode electrode 106 and the anode electrode 104 of each cell 102 in the stacks 100P of cells, however, preferably do not extend continuously to another cell 102 in another one of the stacks 100P. In an embodiment, spaces between electrodes 104, 106 of adjacent stacks 100P contain an electrolyte reservoir.

In an embodiment, the electrochemical device 300 further includes a combined positive bus and first end plate 122c which electrically connects all positive outputs of the plurality of the stacks and a combined negative bus and second end plate 122a which electrically connects all negative outputs of the plurality of the stacks 100P. In addition, the base 116b may include external electrical contacts 124 which allow the electrochemical device 300 to be quickly and easily attached to a load.

In an embodiment, the electrochemical device 300 is a hybrid electrochemical device described above. Preferably in this embodiment, all of the electrochemical cells 102 of the stacks 100P of electrochemical cells 102 are hybrid electrochemical cells. As in the embodiments discussed above, the hybrid electrochemical cell 102 may include a cathode electrode 106 that includes doped or undoped cubic spinel $\lambda$-$MnO_2$-type material or $NaMn_9O_{18}$ tunnel structured orthorhombic material and an anode electrode 104 that includes activated carbon and the electrolyte comprises an aqueous electrolyte containing sodium ions. Other cathode and anode materials may be used as discussed below. The device may comprise a secondary battery, such as a Li-ion or Na-ion battery in an alternative embodiment.

Figure 5:
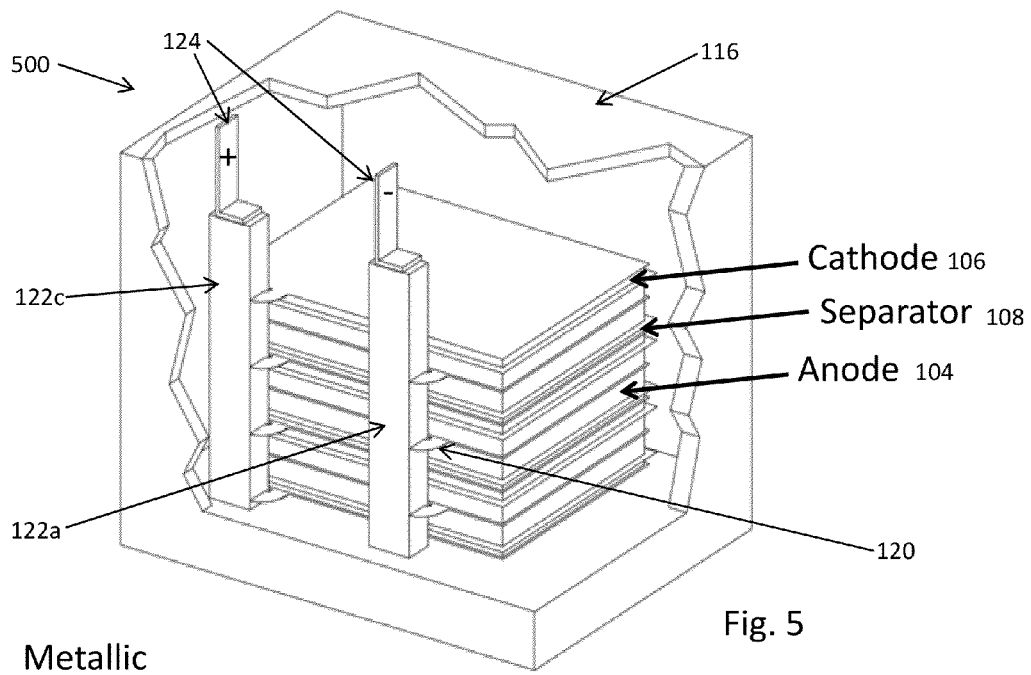
FIG. 5 is a perspective view of an electrochemical device having a single prismatic stack of electrochemical cells according to an embodiment.
Figure 6:
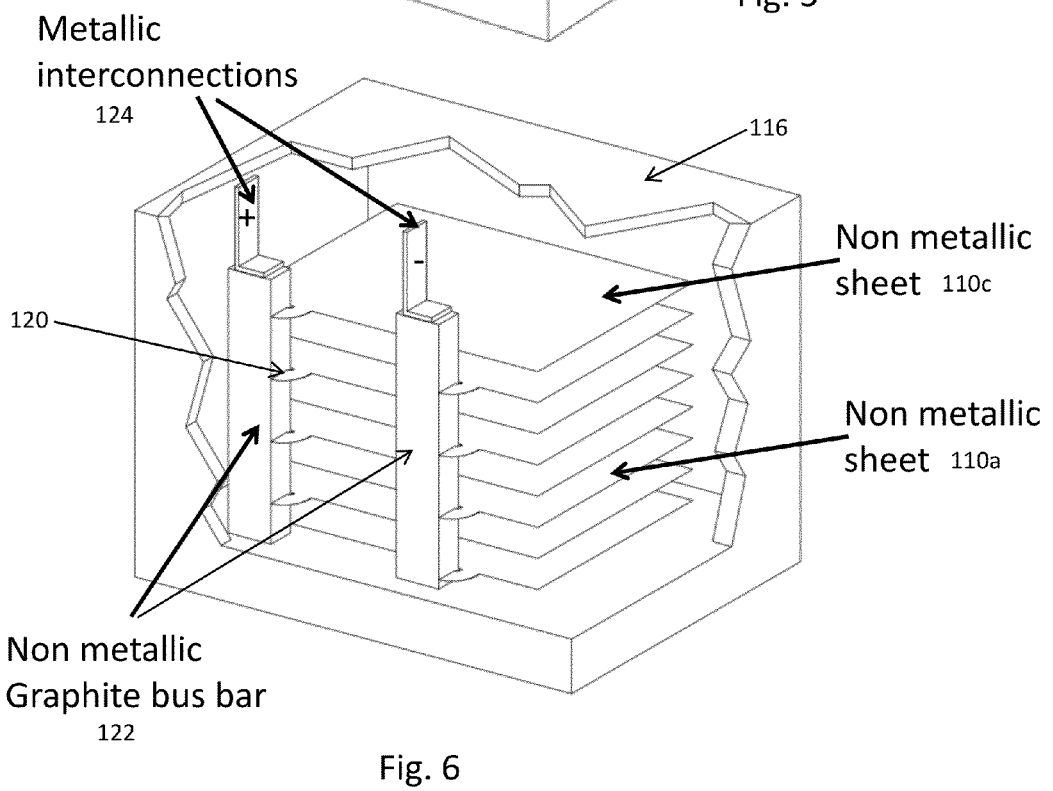
FIG. 6 is a perspective view of the embodiment of FIG. 5 with the electrochemical cells removed for clarity.

Another embodiment of the invention is illustrated in FIGS. 5 and 6. In this embodiment, the electrochemical device 500 as illustrated includes a single prismatic stack 100P of electrochemical cells 102. More than one stack may be used. The single prismatic stack 100P of electrochemical cells 102 is located in a housing 116. The electrochemical device 500 includes an anode bus 122a and a cathode bus 122c. Each of the anodes 104 in the electrochemical cells 102 in the prismatic stack 100P is electrically connected via anode current collectors 110a to the anode bus 122a. In this embodiment, the anodes 104 are connected in parallel. Similarly, each of the cathodes 106 in the electrochemical cells 102 in the prismatic stack 100P is electrically connected to the cathode bus 122c via cathode current collectors 110c. In this embodiment, the cathodes 106 are connected in parallel. Preferably, the anode current collectors 110a and the cathode current collectors 110c are connected to their respective anode bus 122a and cathode bus 122c with conductive tabs 120. The current collectors 110a, 110c may be operatively connected to the respective tabs 120 and/or anode and cathode buses 122a, 122c with a pressure/friction fitting; a conducting, electrochemically inert cured paint; or a conducting, electrochemically inert cured epoxy. The electrochemical device 500 also includes external electrical contacts 124 to provide electricity from the electrochemical device 500 to an external device or circuit. In an embodiment, the external electrical contacts 124 are located on top of the anode bus 122a and the cathode bus 122c. Alternatively, the contacts may be located on the bottom or sides of the buses. The contacts may be located on the same or different sides of the device.

In an embodiment, all of the components of the electrochemical device 500 that typically come in contact with the electrolyte (i.e., the anode 104, cathode 106, separator 108, current collectors 110, buses 122, tabs 120, and the housing 116) are made of non-metallic materials. In an embodiment, the current collectors 110, the buses 122 and tabs 120 may be made of any suitable electrically conductive form of carbon. The buses and tabs may be made of graphite, carbon fiber, or a carbon based conducting composite (e.g., polymer matrix containing carbon fiber or filler material). The housing 116 may be made of, but is not limited to, an electrochemically inert and electrically insulating polymer. In this manner, the electrochemical device 500 is resistant to corrosion. If the buses 122 do not contact the electrolyte (i.e., the tabs extend through a seal material to external buses), then the buses may be made of metal. The external electrical contacts 124 may be made of a metallic material. In the embodiment illustrated in FIG. 7, the buses 122 are surrounded by a hermetic seal 114 located between the top of the buses 122 the top of the prismatic stack 100P of electrochemical cells 102 and the contacts 124. The seal may comprise a polymer or epoxy material which is impervious to electrolyte and oxygen, such as poly-based epoxy, glue, calk or melt sealed polymer. The buses 122 may be connected to the contacts 124 by soldering, bolts, clamps, and/or pressure provided by the seal material. In this manner, the external electrical contacts 124 can be isolated from the electrolyte, thereby allowing the external electrical contacts 124 to be made of a metallic material, such as copper. This way, only the metal contacts or interconnects 124 protrude from the seal 114 area of the housing 116.

Figure 8:
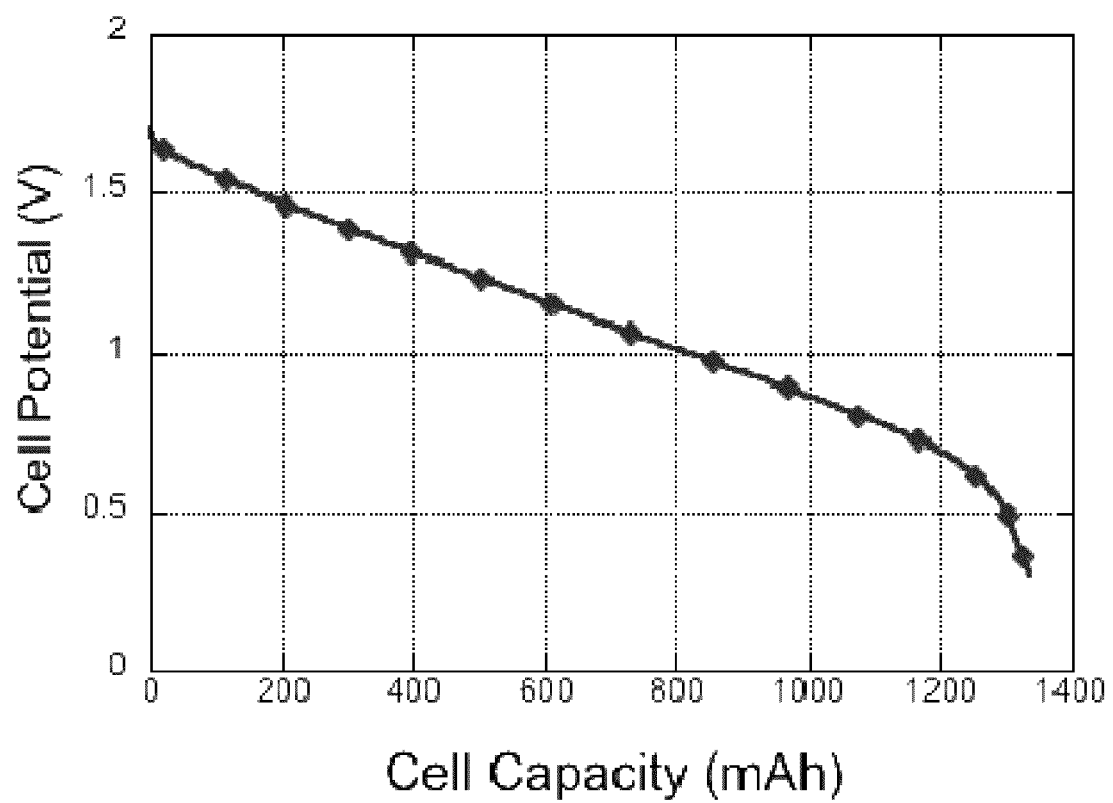
FIG. 8 is a plot of cell potential versus cell capacity of an embodiment.

FIG. 8 is a plot of cell potential versus cell capacity of an embodiment of an electrochemical device 500. As can be seen in the plot, a high cell capacity, such as greater than 1200 mAh for voltage of 0.5V and below can be achieved.

FIG. 9 illustrates an embodiment of an electrochemical cell 102. The electrochemical cell 102 includes an anode electrode 104, a cathode electrode 106 and a separator 108 between the anode electrode 104 and the cathode electrode 106. The electrochemical cell 102 also includes an electrolyte located between the anode electrode 104 and the cathode electrode 106. In an embodiment, the separator 108 may be porous with electrolyte located in the pores. The electrolyte may be aqueous or non-aqueous. The electrochemical cell 102 may also include a graphite sheet 110 that acts as a current collector for the electrochemical cell 102. Preferably, the graphite sheet 110 is densified. In an embodiment, the density of the graphite sheet 110 is greater than 0.6 g/cm$^3$. The graphite sheet 110 may be made from, for example, exfoliated graphite. In an embodiment, the graphite sheet 110 may include one or more foil layers. Suitable materials for the anode electrode 104, the cathode electrode 106, the separator 108 and the electrolyte are discussed in more detail below.

The anode electrode 104, the cathode electrode 106, the separator 108 and the graphite sheet current collector 110 may be mounted in a frame 112 which seals each individual cell. The frame 112 is preferably made of an electrically insulating material, for example, an electrically insulating plastic or epoxy. The frame 112 may be made from preformed rings, poured epoxy or a combination of the two. In an embodiment, the frame 112 may comprise separate anode and cathode frames. In an embodiment, the graphite sheet current collector 110 may be configured to act as a seal 114 with the frame 112. That is, the graphite sheet current collector 110 may extend into a recess in the frame 112 to act as the seal 114. In this embodiment, the seal 114 prevents electrolyte from flowing from one electrochemical cell 102 to an adjacent electrochemical cell 102. In alternative embodiments, a separate seal 114, such as a washer or gasket, may be provided such that the graphite sheet current collector does not perform as a seal.

In an embodiment, the electrochemical cell is a hybrid electrochemical cell. That is, the cathode electrode 106 in operation reversibly intercalates alkali metal cations and the anode electrode 104 comprises a capacitive electrode which stores charge through either (1) a reversible nonfaradiac reaction of alkali metal cations on a surface of the anode electrode or (2) a pseudocapacitive electrode which undergoes a partial charge transfer surface interaction with alkali metal cations on a surface of the anode electrode.

Figure 11:
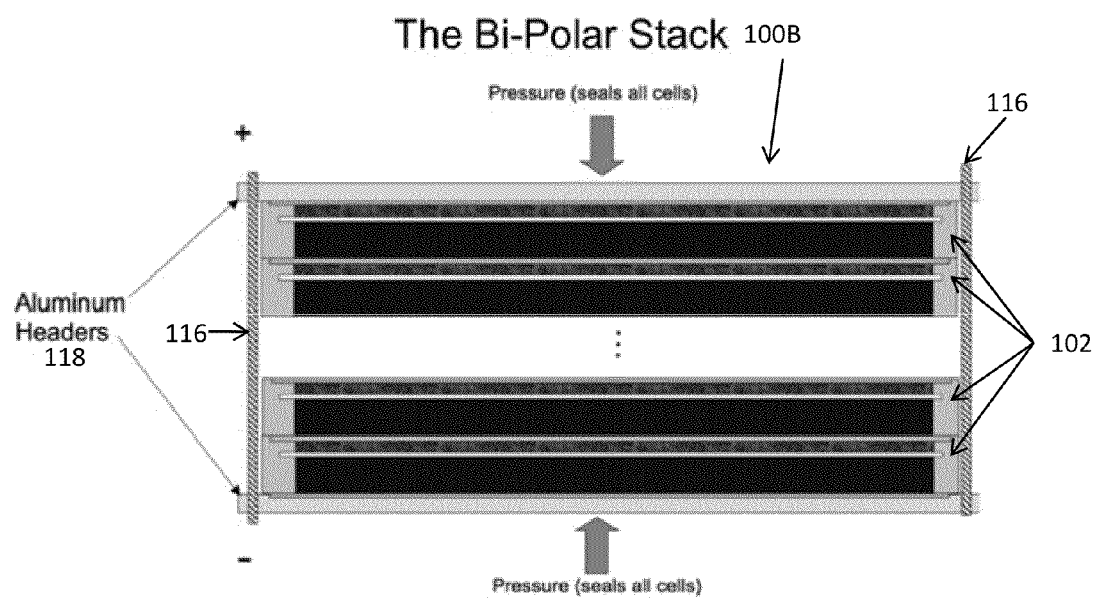
FIG. 11 is a schematic illustration of an electrochemical device comprising a bipolar stack of electrochemical cells according to an embodiment of the invention.

FIG. 11 illustrates a bipolar stack 100B of electrochemical cells 102 according to another embodiment. In contrast to conventional stacks of electrochemical cells which include separate anode side and cathode side current collectors, the bipolar stack 100B operates with a single graphite sheet current collector 110 located between the cathode electrode 106 of one electrochemical cell 102 and the anode electrode 104 of an adjacent electrochemical cell 102. Thus, bipolar stack 100B only uses half as many current collectors as the conventional stack of electrochemical cells.

In an embodiment, the bipolar stack 100B is enclosed in an outer housing 116 and provided with conducting headers 118 on the top and bottom of the bipolar stack 100B. The headers 118 preferably comprise a corrosion resistant current collector metal, including but not limited to, aluminum, nickel, titanium and stainless steel. Preferably, pressure is applied to the bipolar stack 100B when assembled. The pressure aids in providing good seals to prevent leakage of electrolyte.

In an embodiment, the electrochemical cell 102 is a secondary hybrid aqueous energy storage device. In this embodiment, the anode electrode 104 and cathode electrode 106 may be between 0.05 and 1 cm thick, such as between 0.05 and 0.15 cm thick.

FIG. 10 illustrates another embodiment of the invention. In this embodiment, the anode electrode 104 may include discrete anode electrode members 104a separated by anode boundary areas 104b. Further, the cathode electrode 106 may include discrete cathode electrode members 106a separated by cathode boundary areas 106b. As illustrated, the anode electrode 104 includes two discrete anode electrode members 104a and the cathode electrode 106 includes three discrete cathode electrode members 106a. However, this is for illustration only. The anode electrode 104 and the cathode electrode 106 may include any number of discrete anode electrode members 104a and discrete cathode electrode members 106a, respectively. Additionally, in an embodiment, the anode boundary areas 104b and the cathode boundary areas 106b may comprise electrolyte filled voids.

Further, FIG. 10 only illustrates a cross section in one dimension. A cross sectional view in an orthogonal direction may also illustrate the anode electrode 104 and the cathode electrode 106 having discrete anode electrode members 104a and discrete cathode electrode members 106a. That is, the anode electrode 104 and the cathode electrode 106 may comprise a two dimensional checkerboard pattern. In other words, the discrete anode electrode members 104a and discrete cathode electrode members 106a may be arranged in an array of rows and columns. The individual discrete anode electrode members 104a and discrete cathode electrode members 106a may, for example, be square or rectangular in shape. In an embodiment, the inventors have found that providing the anode electrode 104 and the cathode electrode 106 with a different number of discrete anode electrode members 104a and discrete cathode electrode members 106a improves the structural integrity of electrochemical cells 102. In this embodiment, the anode rows and columns are offset from the cathode rows and columns In an embodiment, at least 50%, such as 50-100%, including 75-95% of the anode boundary areas 104b are not aligned with a respective cathode boundary areas 106b across the separator 108. Alternatively, the anode electrode 104 and the cathode electrode 106 may include the same number of discrete anode electrode members 104a as discrete cathode electrode members 106a. In an alternative embodiment, either the anode electrode 104 or the cathode electrode 106 may comprise a single unitary sheet while the other electrode comprises a checkerboard pattern of discrete members.

In an embodiment, the anode electrode members 104a and the cathode electrode members 106a are made from rolled sheet or pressed pellets of activated carbon and manganese oxide, respectively. Another embodiment is drawn to a method of making an electrochemical device of FIG. 10, which includes the steps of (1) stacking an anode electrode 104 that includes a plurality of discrete anode electrode members 104a separated by anode boundary areas 104b, (2) stacking a separator 108 on the anode electrode 104 and (3) stacking a cathode electrode 106 comprising a plurality of discrete cathode electrode members 106a separated by cathode boundary areas 106b on the separator 108. In one aspect, at least 50% of the anode boundary areas 104b are not aligned with a respective cathode boundary areas 106b across the separator 108. The method may also include a step of stacking a graphite sheet current collector 110 on the cathode electrode 106. The anode electrode members 104a and/or the cathode electrode members 106b may be formed by cutting the members 104a, 106a from a rolled sheet of anode or cathode material, or by pressing a pellet of anode or cathode material.

Another embodiment of the invention is drawn to a method of making a stack 100B, 100P of electrochemical cells 102. The method may include the steps of forming a stack electrochemical cells and pouring an electrically insulating polymer around the stack 100B,P of electrochemical cells 102. The method may also include the step of solidifying the polymer to form a solid insulating shell or frame 112. Alternatively, the method may include the step of providing a preformed solid insulating shell 112 around the stack of electrochemical cells 102. The polymer may be, but is not limited to, an epoxy or an acrylic.

The method may also include affixing conducting end plate headers 118 shown in FIG. 11, to the top and bottom of the stack 110. The stack 110 and the solid insulating shell or frame 112 may then be placed in a hollow cylindrical shell or outer housing 116. The method also includes placing a graphite sheet current collector 110 between adjacent electrochemical cells 102 in the stack 100B,P of electrochemical cells 102. In an embodiment, each electrochemical cell 102 in the stack 100B,P of electrochemical cells 102 comprises an anode electrode 104 having an active anode area and a cathode electrode 106 having an active cathode area. The graphite sheet current collector 110 may have an area larger than the active anode area and the active cathode area to act as a seal as shown in FIG. 9.

Device Components
Cathode

Several materials comprising a transition metal oxide, sulfide, phosphate, or fluoride can be used as active cathode materials capable of reversible Na-ion intercalation/deintercalation. Materials suitable for use as active cathode materials in embodiments of the present invention preferably contain alkali atoms, such as sodium, lithium, or both, prior to use as active cathode materials. It is not necessary for an active cathode material to contain Na and/or Li in the as-formed state (that is, prior to use in an energy storage device). However, Na cations from the electrolyte must be able to incorporate into the active cathode material by intercalation during operation of the energy storage device. Thus, materials that may be used as cathodes in the present invention comprise materials that do not necessarily contain Na in an as-formed state, but are capable of reversible intercalation/deintercalation of Na-ions during discharging/charging cycles of the energy storage device without a large overpotential loss.

In embodiments where the active cathode material contains alkali-atoms (preferably Na or Li) prior to use, some or all of these atoms are deintercalated during the first cell charging cycle. Alkali cations from the electrolyte (overwhelmingly Na cations) are re-intercalated during cell discharge. This is different than nearly all of the hybrid capacitor systems that call out an intercalation electrode opposite activated carbon. In most systems, cations from the electrolyte are adsorbed on the anode during a charging cycle. At the same time, the counter-anions, such as hydrogen ions, in the electrolyte intercalate into the active cathode material, thus preserving charge balance, but depleting ionic concentration, in the electrolyte solution. During discharge, cations are released from the anode and anions are released from the cathode, thus preserving charge balance, but increasing ionic concentration, in the electrolyte solution. This is a different operational mode from devices in embodiments of the present invention, where hydrogen ions or other anions are preferably not intercalated into the cathode active material.

Suitable active cathode materials may have the following general formula during use: $A_xM_yO_z$, where A is Na or a mixture of Na and one or more of Li, K, Be, Mg, and Ca, where x is within the range of 0 to 1, inclusive, before use and within the range of 0 to 10, inclusive, during use; M comprises any one or more transition metal, where y is within the range of 1 to 3, inclusive; preferably within the range of 1.5 and 2.5, inclusive; and O is oxygen, where z is within the range of 2 to 7, inclusive; preferably within the range of 3.5 to 4.5, inclusive.

In some active cathode materials with the general formula $A_xM_yO_z$, Na-ions reversibly intercalate/deintercalate during the discharge/charge cycle of the energy storage device. Thus, the quantity x in the active cathode material formula changes while the device is in use.

In some active cathode materials with the general formula $A_xM_yO_z$, A comprises at least 50 at % of at least one or more of Na, K, Be, Mg, or Ca, optionally in combination with Li; M comprises any one or more transition metal; O is oxygen; x ranges from 3.5 to 4.5 before use and from 1 to 10 during use; y ranges from 8.5 to 9.5 and z ranges from 17.5 to 18.5. In these embodiments, A preferably comprises at least 51 at % Na, such as at least 75 at % Na, and 0 to 49 at %, such as 0 to 25 at %, Li, K, Be, Mg, or Ca; M comprises one or more of Mn, Ti, Fe, Co, Ni, Cu, V, or Sc; x is about 4 before use and ranges from 0 to 10 during use; y is about 9; and z is about 18.

In some active cathode materials with the general formula $A_xM_yO_z$, A comprises Na or a mix of at least 80 atomic percent Na and one or more of Li, K, Be, Mg, and Ca. In these embodiments, x is preferably about 1 before use and ranges from 0 to about 1.5 during use. In some preferred active cathode materials, M comprises one or more of Mn, Ti, Fe, Co, Ni, Cu, and V, and may be doped (less than 20 at %, such as 0.1 to 10 at %; for example, 3 to 6 at %) with one or more of Al, Mg, Ga, In, Cu, Zn, and Ni.

General classes of suitable active cathode materials include (but are not limited to) the layered/orthorhombic $NaMO_2$ (birnessite), the cubic spinel based manganate (e.g., $MO_2$, such as $\lambda$-$MnO_2$ based material where M is Mn, e.g., $Li_xM_2O_4$ (where $1 \leq x < 1.1$) before use and $Na_yMn_2O_4$ in use), the $Na_2M_3O_7$ system, the $NaMPO_4$ system, the $NaM_2(PO_4)_3$ system, the $Na_2MPO_4F$ system, and the tunnel-structured $Na_{0.44}MO_2$, where M in all formula comprises at least one transition metal. Typical transition metals may be Mn or Fe (for cost and environmental reasons), although Co, Ni, Cr, V, Ti, Cu, Zr, Nb, W, Mo (among others), or combinations thereof, may be used to wholly or partially replace Mn, Fe, or a combination thereof. In embodiments of the present invention, Mn is a preferred transition metal. In some embodiments, cathode electrodes may comprise multiple active cathode materials, either in a homogenous or near homogenous mixture or layered within the cathode electrode.

In some embodiments, the initial active cathode material comprises $NaMnO_2$ (birnassite structure) optionally doped with one or more metals, such as Li or Al.

In some embodiments, the initial active cathode material comprises $\lambda$-$MnO_2$ (i.e., the cubic isomorph of manganese oxide) based material, optionally doped with one or more metals, such as Li or Al.

In these embodiments, cubic spinel $\lambda$-$MnO_2$ may be formed by first forming a lithium containing manganese oxide, such as lithium manganate (e.g., cubic spinel $LiMn_2O_4$ or non-stoichiometric variants thereof). In embodiments which utilize a cubic spinel $\lambda$-$MnO_2$ active cathode material, most or all of the Li may be extracted electrochemically or chemically from the cubic spinel $LiMn_2O_4$ to form cubic spinel $\lambda$-$MnO_2$ type material (i.e., material which has a 1:2 Mn to O ratio, and/or in which the Mn may be substituted by another metal, and/or which also contains an alkali metal, and/or in which the Mn to O ratio is not exactly 1:2). This extraction may take place as part of the initial device charging cycle. In such instances, Li-ions are deintercalated from the as-formed cubic spinel $LiMn_2O_4$ during the first charging cycle. Upon discharge, Na-ions from the electrolyte intercalate into the cubic spinel $\lambda$-$MnO_2$. As such, the formula for the active cathode material during operation is $Na_yLi_xMn_2O_4$ (optionally doped with one or more additional metal as described above, preferably Al), with $0<x<1$, $0<y<1$, and $x+y \leq 1.1$. Preferably, the quantity x+y changes through the charge/discharge cycle from about 0 (fully charged) to about 1 (fully discharged). However, values above 1 during full discharge may be used. Furthermore, any other suitable formation method may be used. Non-stoichiometric $Li_xMn_2O_4$ materials with more than 1 Li for every 2 Mn and 4 O atoms may be used as initial materials from which cubic spinel $\lambda$-$MnO_2$ may be formed (where $1 \leq x < 1.1$ for example). Thus, the cubic spinel $\lambda$-manganate may have a formula $Al_zLi_xMn_{2-z}O_4$ where $1 \leq x < 1.1$ and $0 \leq z < 0.1$ before use, and $Al_zLi_xNa_yMn_2O_4$ where $0 \leq x < 1.1$, $0 \leq x < 1$, $0 \leq x+y < 1.1$, and $0 \leq z < 0.1$ in use (and where Al may be substituted by another dopant).

In some embodiments, the initial cathode material comprises $Na_2Mn_3O_7$, optionally doped with one or more metals, such as Li or Al.

In some embodiments, the initial cathode material comprises $Na_2FePO_4F$, optionally doped with one or more metals, such as Li or Al.

In some embodiments, the cathode material comprises $Na_{0.44}MnO_2$, optionally doped with one or more metals, such as Li or Al. This active cathode material may be made by thoroughly mixing $Na_2CO_3$ and $Mn_2O_3$ to proper molar ratios and firing, for example at about 800° C. The degree of Na content incorporated into this material during firing determines the oxidation state of the Mn and how it bonds with $O_2$ locally. This material has been demonstrated to cycle between $0.33<x<0.66$ for $Na_xMnO_2$ in a non-aqueous electrolyte.

Optionally, the cathode electrode may be in the form of a composite cathode comprising one or more active cathode materials (e.g., 1-49%, such as 2-10% by weight of the minor component, such as the orthorhombic tunnel structured material, a high surface area conductive diluent (such as conducting grade graphite, carbon blacks, such as acetylene black, non-reactive metals, and/or conductive polymers), a binder, a plasticizer, and/or a filler. Exemplary binders may comprise polytetrafluoroethylene (PTFE), a polyvinylchloride (PVC)-based composite (including a PVC-$SiO_2$ composite), cellulose-based materials, polyvinylidene fluoride (PVDF), hydrated birnassite (when the active cathode material comprises another material), other non-reactive non-corroding polymer materials, or a combination thereof. A composite cathode may be formed by mixing a portion of one or more preferred active cathode materials with a conductive diluent, and/or a polymeric binder, and pressing the mixture into a pellet. In some embodiments, a composite cathode electrode may be formed from a mixture of about 50 to 90 wt % active cathode material, with the remainder of the mixture comprising a combination of one or more of diluent, binder, plasticizer, and/or filler. For example, in some embodiments, a composite cathode electrode may be formed from about 80 wt % active cathode material, about 10 to 15 wt % diluent, such as carbon black, and about 5 to 10 wt % binder, such as PTFE.

One or more additional functional materials may optionally be added to a composite cathode to increase capacity and replace the polymeric binder. These optional materials include but are not limited to Zn, Pb, hydrated $NaMnO_2$ (birnassite), and hydrated $Na_{0.44}MnO_2$ (orthorhombic tunnel structure). In instances where hydrated $NaMnO_2$ (birnassite) and/or hydrated $Na_{0.44}MnO_2$ (orthorhombic tunnel structure) is added to a composite cathode, the resulting device has a dual functional material composite cathode.

A cathode electrode will generally have a thickness in the range of about 40 to 800 µm.

Anode:

The anode may comprise any material capable of reversibly storing Na-ions through surface adsorption/desorption (via an electrochemical double layer reaction and/or a pseudocapacitive reaction (i.e., a i.e. partial charge transfer surface interaction)) and have sufficient capacity in the desired voltage range. Exemplary materials meeting these requirements include porous activated carbon, graphite, mesoporous carbon, carbon nanotubes, disordered carbon, Ti-oxide (such as titania) materials, V-oxide materials, phospho-olivine materials, other suitable mesoporous ceramic materials, and a combinations thereof. In preferred embodiments, activated carbon is used as the anode material.

Optionally, the anode electrode may be in the form of a composite anode comprising one or more anode materials, a high surface area conductive diluent (such as conducting grade graphite, carbon blacks, such as acetylene black, non-reactive metals, and/or conductive polymers), a binder, such as PTFE, a PVC-based composite (including a PVC-$SiO_2$ composite), cellulose-based materials, PVDF, other non-reactive non-corroding polymer materials, or a combination thereof, plasticizer, and/or a filler. A composite anode may be formed my mixing a portion of one or more preferred anode materials with a conductive diluent, and/or a polymeric binder, and pressing the mixture into a pellet. In some embodiments, a composite anode electrode may be formed from a mixture from about 50 to 90 wt % anode material, with the remainder of the mixture comprising a combination of one or more of diluent, binder, plasticizer, and/or filler. For example, in some embodiments, a composite cathode electrode may be formed from about 80 wt % activated carbon, about 10 to 15 wt % diluent, such as carbon black, and about 5 to 10 wt % binder, such as PTFE.

One or more additional functional materials may optionally be added to a composite anode to increase capacity and replace the polymeric binder. These optional materials include but are not limited to Zn, Pb, hydrated $NaMnO_2$ (birnassite), and hydrated $Na_{0.44}MnO_2$ (orthorhombic tunnel structure).

An anode electrode will generally have a thickness in the range of about 80 to 1600 µm.

Electrolyte:

Electrolytes useful in embodiments of the present invention comprise a salt dissolved fully in water. For example, the electrolyte may comprise a 0.1 M to 10 M solution of at least one anion selected from the group consisting of $SO_4^{2-}$, $NO_3^-$, $ClO_4^-$, $PO_4^{3-}$, $CO_3^{2-}$, $Cl^-$, and/or $OH^-$. Thus, Na cation containing salts may include (but are not limited to) $Na_2SO_4$, $NaNO_3$, $NaClO_4$, $Na_3PO_4$, $Na_2CO_3$, $NaCl$, and $NaOH$, or a combination thereof.

In some embodiments, the electrolyte solution may be substantially free of Na. In these instances, cations in salts of the above listed anions may be an alkali other than Na (such as K) or alkaline earth (such as Ca, or Mg) cation. Thus, alkali other than Na cation containing salts may include (but are not limited to) $K_2SO_4$, $KNO_3$, $KClO_4$, $K_3PO_4$, $K_2CO_3$, $KCl$, and $KOH$. Exemplary alkaline earth cation containing salts may include $CaSO_4$, $Ca(NO_3)_2$, $Ca(ClO_4)_2$, $CaCO_3$, and $Ca(OH)_2$, $MgSO_4$, $Mg(NO_3)_2$, $Mg(ClO_4)_2$, $MgCO_3$, and $Mg(OH)_2$. Electrolyte solutions substantially free of Na may be made from any combination of such salts. In other embodiments, the electrolyte solution may comprise a solution of a Na cation containing salt and one or more non-Na cation containing salt.

Molar concentrations preferably range from about 0.05 M to 3 M, such as about 0.1 to 1 M, at 100° C. for $Na_2SO_4$ in water depending on the desired performance characteristics of the energy storage device, and the degradation/performance limiting mechanisms associated with higher salt concentrations. Similar ranges are preferred for other salts.

A blend of different salts (such as a blend of a sodium containing salt with one or more of an alkali, alkaline earth, lanthanide, aluminum and zinc salt) may result in an optimized system. Such a blend may provide an electrolyte with sodium cations and one or more cations selected from the group consisting of alkali (such as K), alkaline earth (such as Mg and Ca), lanthanide, aluminum, and zinc cations.

Optionally, the pH of the electrolyte may be altered by adding some additional $OH^-$ ionic species to make the electrolyte solution more basic, for example by adding NaOH other OH-containing salts, or by adding some other $OH^-$ concentration-affecting compound (such as $H_2SO_4$ to make the electrolyte solution more acidic). The pH of the electrolyte affects the range of voltage stability window (relative to a reference electrode) of the cell and also can have an effect on the stability and degradation of the active cathode material and may inhibit proton ($H^+$) intercalation, which may play a role in active cathode material capacity loss and cell degradation. In some cases, the pH can be increased to 11 to 13, thereby allowing different active cathode materials to be stable (than were stable at neutral pH 7). In some embodiments, the pH may be within the range of about 3 to 13, such as between about 3 and 6 or between about 8 and 13.

Optionally, the electrolyte solution contains an additive for mitigating degradation of the active cathode material, such as birnassite material. An exemplary additive may be, but is not limited to, $Na_2HPO_4$, in quantities sufficient to establish a concentration ranging from 0.1 mM to 100 mM.

Separator:

A separator for use in embodiments of the present invention may comprise a cotton sheet, PVC (polyvinyl chloride), PE (polyethylene), glass fiber or any other suitable material.

Operational Characteristics

As described above, in embodiments where the active cathode material contains alkali-atoms (preferably Na or Li) prior to use, some or all of these atoms are deintercalated during the first cell charging cycle Alkali cations from the electrolyte (overwhelmingly Na cations) are re-intercalated during cell discharge. This is different than nearly all of the hybrid capacitor systems that call out an intercalation electrode opposite activated carbon. In most systems, cations from the electrolyte are adsorbed on the anode during a charging cycle. At the same time, the counter-anions in the electrolyte intercalate into the active cathode material, thus preserving charge balance, but depleting ionic concentration, in the electrolyte solution. During discharge, cations are released from the anode and anions are released from the cathode, thus preserving charge balance, but increasing ionic concentration, in the electrolyte solution. This is a different operational mode from devices in embodiments of the present invention.

Example

Figure 7:
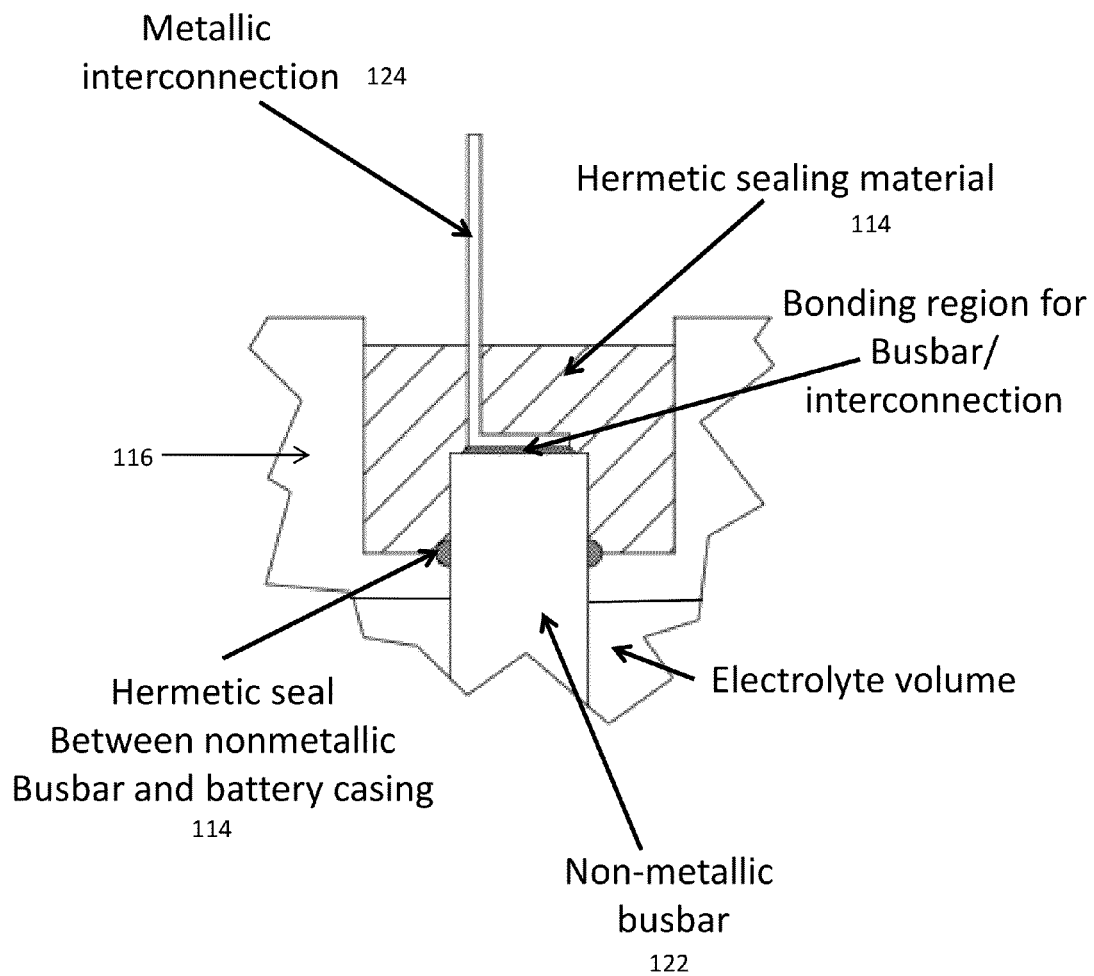
FIG. 7 is a schematic side cross sectional view illustrating details of a portion of the embodiment illustrated in FIG. 5.

A hybrid energy storage device having the prismatic/parallel electrical connection shown in FIG. 1A and a physical structure shown in FIGS. 5-7 was assembled. The device containing were three levels of anode 104/cathode 106 sets (of 2 each) with an expanded graphite sheet current collector 110a, 110c structures (500 microns thick) and non-woven fibrous separator material 108, as shown in FIG. 5. The cathode contained a $\lambda$-$MnO_2$ phase active material as described above, and was made from a compacted granulate of active material, carbon black, graphite powder and PTFE. The anode contained activated carbon mixed with carbon black and PTFE. Pressure was used to contact each graphite anode and cathode current collector 110a, 110c with a respective anode and cathode graphite bus bars 122a, 122c that served as the positive and negative bus bars for the device. A polypropylene enclosure 116 was used to house the device and the graphite bus bars 122a, 122c were fed through properly sized holes in the polypropylene enclosure and were then sealed against the polypropylene with a silicone adhesive material. Copper wires were then connected via pressure with the external (non-electrolyte touching) bus bars 124 coming out of the enclosure and the entire external bus bar was covered with potting epoxy.

The device was then taken through 15 formation cycles and was then tested for energy storage capacity and stability though many cycles. FIG. 12 shows the results of this testing. FIG. 12(a) shows the device potential vs. accumulated capacity under charge and discharge conditions over 30 cycles. The cycling was performed at a C/6 current rating, and the device had a capacity of approximately 1.1 Ah. The data show near perfect overlap of the voltage profiles from cycle to cycle, indicative of a system that is extremely stable and exhibits no loss in capacity or has any internal corrosion. FIG. 12(b) is a plot of cell charge and discharge capacity as a function of cycle. There is no loss in capacity as function of cycle through at least 60 cycles. Data from other cells indicate that this should be maintained though thousands of cycles. Also, the columbic efficiency was found to be 98 to 100% for these cycles.

This example shows that a highly stable aqueous electrolyte hybrid energy storage device is created without the use of any metal inside the battery casing. The device exhibits excellent stability and shows great promise for long-term use in a variety of energy storage applications.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. An electrochemical device, comprising:
a housing;
a stack of electrochemical cells in the housing, each electrochemical cell comprising:
an anode electrode;
a cathode electrode;
a separator located between the anode electrode and the cathode electrode; and
an electrolyte;
a plurality of carbon cathode and anode current collectors alternately located between adjacent electrochemical cells;
a first plurality of tabs operatively connected to the plurality of carbon cathode current collectors and a second plurality of tabs operatively connected to the plurality of carbon anode current collectors;
wherein:
a cathode electrode of a first electrochemical cell electrically contacts a first cathode current collector;
a cathode electrode of a second electrochemical cell electrically contacts the first cathode current collector, the second electrochemical cell is located adjacent to a first side of the first electrochemical cell in the stack;
an anode electrode of the first electrochemical cell electrically contacts a second anode current collector; and
an anode electrode of a third electrochemical cell electrically contacts the second anode current collector, the third electrochemical cell is located adjacent to a second side of the first electrochemical cell in the stack.

2. The electrochemical deice of claim 1, wherein the first plurality of tabs are configured to contact each other and the second plurality of tabs are configured to contact each other.

3. The electrochemical device of claim 1, wherein the electrochemical device is a hybrid aqueous electrolyte energy storage device.

4. The electrochemical device of claim 3, wherein the cathode comprises an alkali ion intercalation material and the anode is a pseudocapacitive or electrochemical double layer capacitive material that is electrochemically stable to less than −1.3 V vs. NHE.

5. The electrochemical device of claim 4, wherein the cathode electrode comprises a doped or undoped cubic spinel $\lambda$-$MnO_2$-type material or $NaMn_9O_{18}$ tunnel structured orthorhombic material, the anode electrode comprises activated carbon, titanium oxide material or phospho-olivine material, the electrolyte comprises sodium ions, and the current collectors comprise carbon fiber paper, an inert substrate coated with carbon material or exfoliated graphite having a density of greater than 0.6 g/cm$^3$.

6. The electrochemical device of claim 5, wherein the electrolyte is an aqueous solution containing dissolved alkali ions that are able to interact with both anode and cathode such that charge may be stored via intercalation at the cathode electrode and by pseudocapacitive non-faradic surface reaction at the anode electrode.

7. The electrochemical device of claim 1, wherein the housing comprises a hermetically sealed, electrochemically inert polymer housing, and the electrochemical cells in the stack of electrochemical cells are stacked in a prismatic configuration.

8. The electrochemical device of claim 1, wherein:
the anode electrode comprises a plurality of discrete anode electrode members separated by anode boundary areas;
the cathode electrode comprises a plurality of discrete cathode electrode members separated by cathode boundary areas;
the separator extends over or under the anode boundary areas and the cathode boundary areas; and
the electrolyte is located in the separator and in anode electrode and cathode electrode boundary areas.

9. The electrochemical device of claim 1, wherein:
the anode and cathode electrodes are between 0.05 and 1 cm thick;
the anode electrode comprises a pressed granular anode electrode; and
the cathode electrode comprises a pressed granular cathode electrode.

10. An electrochemical device, comprising:
a housing;
a stack of electrochemical cells in the housing, each electrochemical cell comprising:
a pressed granular anode electrode;
a pressed granular cathode electrode;
a separator located between the anode electrode and the cathode electrode; and
an electrolyte;
a plurality of cathode and anode current collectors alternately located between adjacent electrochemical cells;
wherein:
a cathode electrode of a first electrochemical cell electrically contacts a first cathode current collector;
a cathode electrode of a second electrochemical cell electrically contacts the first cathode current collector, the second electrochemical cell is located adjacent to a first side of the first electrochemical cell in the stack;
an anode electrode of the first electrochemical cell electrically contacts a second anode current collector; and
an anode electrode of a third electrochemical cell electrically contacts the second anode current collector, the third electrochemical cell is located adjacent to a second side of the first electrochemical cell in the stack.

11. The electrochemical device of claim 10, wherein the anode and cathode electrodes are between 0.05 and 1 cm thick, and the current collectors comprise carbon current collectors.

12. The electrochemical device of claim 11, wherein the current collectors comprise carbon fiber paper, an inert substrate coated with carbon material or exfoliated graphite having a density of greater than 0.6 g/cm$^3$.

13. The electrochemical device of claim 10, wherein the electrochemical device is a hybrid aqueous electrolyte energy storage device.

14. The electrochemical device of claim 13, wherein the cathode comprises an alkali ion intercalation material and the anode is a pseudocapacitive or electrochemical double layer capacitive material that is electrochemically stable to less than −1.3 V vs. NHE.

15. The electrochemical device of claim 14, wherein the cathode electrode comprises a doped or undoped cubic spinel λ-MnO$_2$-type material or NaMn$_9$O$_{18}$ tunnel structured orthorhombic material, the anode electrode comprises activated carbon, titanium oxide material or phospho-olivine material, and the electrolyte comprises sodium ions.

16. The electrochemical device of claim 15, wherein the electrolyte is an aqueous solution containing dissolved alkali ions that are able to interact with both anode and cathode such that charge may be stored via intercalation at the cathode electrode and by pseudocapacitive non-faradic surface reaction at the anode electrode.

17. The electrochemical device of claim 10, wherein the housing comprises a hermetically sealed, electrochemically inert polymer housing, and the electrochemical cells in the stack of electrochemical cells are stacked in a prismatic configuration.

18. The electrochemical device of claim 10, wherein:
the anode electrode comprises a plurality of discrete anode electrode members separated by anode boundary areas;
the cathode electrode comprises a plurality of discrete cathode electrode members separated by cathode boundary areas;
the separator extends over or under the anode boundary areas and the cathode boundary areas; and
the electrolyte is located in the separator and in anode electrode and cathode electrode boundary areas.

* * * * *